(12) United States Patent
Davis et al.

(10) Patent No.: US 8,563,110 B2
(45) Date of Patent: Oct. 22, 2013

(54) OPTICAL DATA MEDIA CONTAINING AN ULTRAVIOLET PROTECTION LAYER

(75) Inventors: Robert C. Davis, Provo, UT (US);
Matthew R. Linford, Orem, UT (US);
Barry M. Lunt, Provo, UT (US)

(73) Assignee: Brigham Young University, Provo, UT (US)

( * ) Notice: Subject to any disclaimer, the term of this patent is extended or adjusted under 35 U.S.C. 154(b) by 301 days.

(21) Appl. No.: 12/558,354

(22) Filed: Sep. 11, 2009

(65) Prior Publication Data

US 2010/0068445 A1    Mar. 18, 2010

Related U.S. Application Data

(60) Provisional application No. 61/191,924, filed on Sep. 12, 2008.

(51) Int. Cl.
*G11B 7/24* (2013.01)

(52) U.S. Cl.
USPC .................... 428/64.1; 428/64.4; 430/270.11

(58) Field of Classification Search
USPC ..................................... 428/64.4; 430/270.11
See application file for complete search history.

(56) References Cited

U.S. PATENT DOCUMENTS

| | | | |
|---|---|---|---|
| 7,009,003 B2 | 3/2006 | Cruz | |
| 7,095,695 B2 | 8/2006 | Kwon et al. | |
| 7,182,008 B2 | 2/2007 | Negishi et al. | |
| 7,494,962 B2 | 2/2009 | Kin et al. | |
| 2001/0033915 A1 | 10/2001 | Ehmann et al. | |
| 2003/0207120 A1 | 11/2003 | Kwasny et al. | |
| 2005/0087102 A1 | 4/2005 | Kuehnle et al. | |
| 2006/0210756 A1 | 9/2006 | Harmon et al. | |
| 2007/0031631 A1 * | 2/2007 | Lundstrom et al. | 428/64.1 |
| 2007/0128442 A1 | 6/2007 | Buehler | |
| 2007/0216300 A1 | 9/2007 | Lee et al. | |
| 2008/0273441 A1 | 11/2008 | Van Der Tempel et al. | |
| 2009/0099282 A1 | 4/2009 | Muller et al. | |

FOREIGN PATENT DOCUMENTS

| | | |
|---|---|---|
| EP | 0302497 | 2/1989 |
| EP | 0488854 A2 | 11/1991 |
| JP | 2001344822 A * | 12/2001 |
| JP | 2006079710 | 3/2006 |
| KR | 1020010093358 | 10/2001 |
| WO | WO2008079437 | 7/2008 |

OTHER PUBLICATIONS

Demir et al., "PMMA/Zinc Oxide Nanocomposites Prepared by In-Situ Bulk Polymerization", (2006), *Macromol. Rapid Commun.*, vol. 27, pp. 763-770.

Ray et al. "Polymer/layered silicate nanocomposites: a review from preparation to processing", (2003), *Prog. Poly. Sci.*, vol. 28, 1539-1641.

Sun et al., "Transparent PMMA/ZnO nanocomposite films based on colloidal ZnO quantum dots", (2007), *Nanotechnology*, vol. 18, pp. 1-6.

(Continued)

*Primary Examiner* — Elizabeth Mulvaney
(74) *Attorney, Agent, or Firm* — Workman Nydegger (57) ABSTRACT

Optical information media containing an ultraviolet protection layer are described. The protection layer will reduce or eliminate damage to the media's data layer and substrate.

27 Claims, 4 Drawing Sheets

(56) References Cited

OTHER PUBLICATIONS

McCormick et al., "Nanopowders Synthesized by Mechanochemical Processing", Jul. 4, 2001, *Adv. Mat.*, Issue 12-13, pp. 1008-1010.
Wu et al., "Surface modifications of ZnO quantum dots for bio-imaging", (2007) *Nanotechnology*, vol. 18, pp. 1-9.
Khrenov et al., "Surfaced Functionalized ZnO Particles Designed for the Use in Transparent Nanocomposites", (2005), *Macromol. Chem. Phys.*, vol. 206, pp. 95-101.
International Search Report, PCT/US2009/056723, Apr. 28, 2010.
Pressit, "SprayFix Print Protection Fixative", Aug. 7, 2003, www.pressit.com/sprayfix-print-protection-fixative.html, Printed Oct. 19, 2009.

* cited by examiner

OPTICAL DATA MEDIA CONTAINING AN ULTRAVIOLET PROTECTION LAYER

This application claims priority under 35 U.S.C. §119(e) to U.S. Provisional Patent Application Ser. No. 61/191,924, filed Sep. 12, 2008, the disclosure of which is incorporated by reference in its entirety.

BACKGROUND OF THE INVENTION

1. Field of the Invention

The invention relates to protective layers for optically readable data discs and, more specifically, to layers that confer resistance to ultraviolet radiation.

2. Description of Related Art

Optically readable data discs (such as CDs and DVDs) are exposed to many varied environmental conditions that can shorten their usable lifetime. Examples of these conditions include heat, cold, water, humidity, sunlight, and physical stress. These conditions can be routine or accidental. Accidental conditions can include spilled coffee, being left in a hot vehicle, bending, abrasion, and so on.

While many conditions have received attention in the industry, resistance to damage caused by light or ultraviolet radiation has not been well addressed.

Discs claiming ultraviolet resistance were released by the TDK Company in 2004 under the trade names ARMOR PLATED DVD™ (in US), SUPER HARD (in Asia), and SCRATCH PROOF (in Europe). The product was renamed DURABIS® in Jan., 2005. The discs are described as having three times greater resistance to UV light than other DVD media. The chemical content was not disclosed, but the UV resistance was contained in the substrate layer of the discs.

An inkjet protection spray is sold under the PRESSIT SPRAYFIX trade name (Medea International; Dundee, Scotland). The liquid material is sprayed from a can onto the surface of an inkjet printable disc, and is advertised to increase water resistance, reduce fading by providing UV protection, and protects the disc from scratches. The spray is applied onto the printed label, which is above the data layer on the polycarbonate substrate. A cross-section of the sprayed product would first intersect the sprayed material, the label, the data layer, and finally the polycarbonate disc substrate. The material that provides UV protection is not identified.

U.S. Patent Publication Nos. 2006-0210756 A1 (published Sep. 21, 2006) and 2001-0033915 A1 (published Oct. 25, 2001) offer a thin flexible polymer layer that is adhered to an optical storage disc using static cling. The polymer does not leave any residue on the disc, and is readily added or removed to a preformed disc. The polymer layer can contain an impregnated ultraviolet protection material.

U.S. Patent Publication No. 2003-0207120 A1 published Nov. 6, 2003) suggests use of clear hot stamp coating methods of creating durable protective coatings to the printed side of CDs. Heat and pressure are applied to a donor web containing carrier ribbon material to facilitate transfer of material to the surface of a digitally readable disc. The formed discs can have improved properties such as light fade resistance, ultraviolet light fade resistance, resistance to liquid penetration, resistance to vapor penetration, scratch resistance, and blocking resistance.

Exposure to ultraviolet light can damage dyes or other components of the data layer in discs. Despite the efforts made to date to improve the environmental resistance of optical media discs, resistance to ultraviolet radiation remains a poorly addressed issue. Thus, there exists a need for materials and methods to improve the ultraviolet radiation resistance of media.

SUMMARY OF THE INVENTION

Optical data media containing a substrate layer, a data layer, and an ultraviolet protection layer are described. The ultraviolet protection layer can be oriented towards the opposite face of the substrate layer relative to the data layer. The ultraviolet protection layer reduces or eliminates damage such as photobleaching, photodegradation, and discoloration in the data layer, substrate layer, or both.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

DETAILED DESCRIPTION OF THE INVENTION

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Materials

Figure 1:
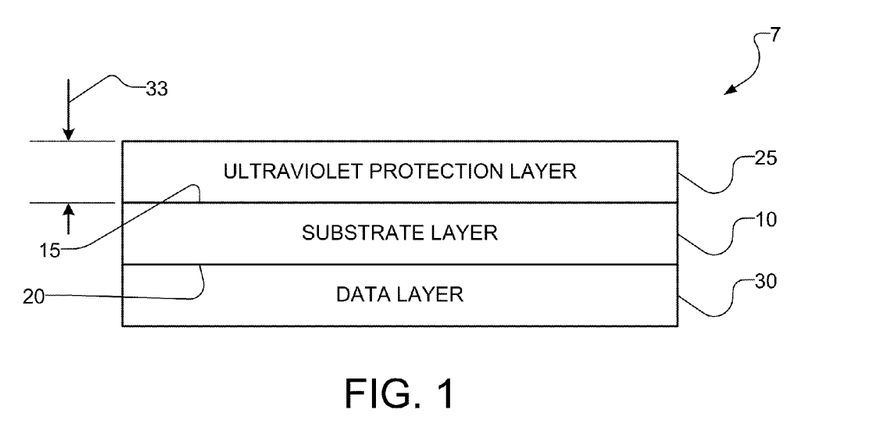
FIG. 1 shows an optical data medium containing a substrate layer, an ultraviolet protection layer on one face of the substrate layer, and a data layer on the opposite face of the substrate layer.

One embodiment of the invention relates to an optical data medium 7 shown in FIG. 1 comprising at least one substrate layer 10 having a first face 15 and a second face 20; a first ultraviolet protection layer 25 oriented towards the first face 15; and a data layer 30 oriented towards the second face 20. In other words, a cross-section would first intersect the first ultraviolet protection layer 25, then the first face 15, then the second face 20, then the data layer 30. In terms of distance, the distance from the data layer 30 to the second face 20 is less than the distance from the data layer 30 to the first face 15.

Figure 2:
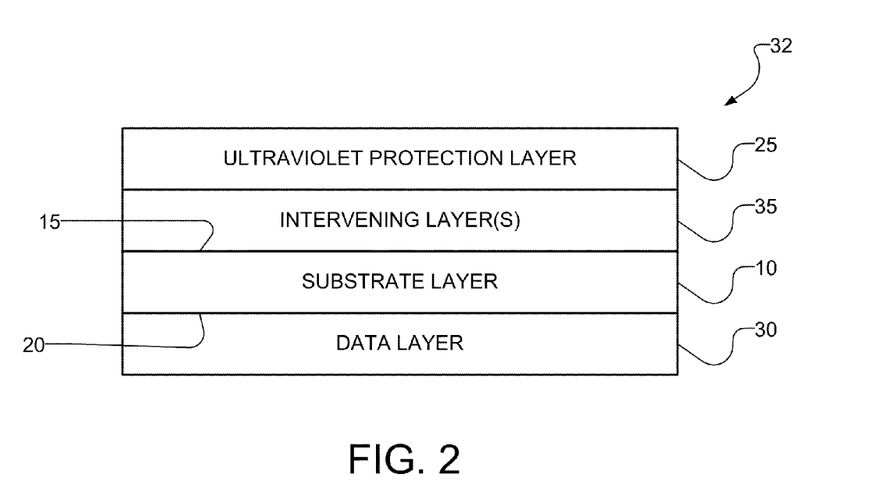
FIG. 2 shows an optical data medium containing a substrate layer, an ultraviolet protection layer, one or more intervening layers between the substrate layer and the ultraviolet protection layer, and a data layer on the opposite face of the substrate layer.

The ultraviolet protection layer 25 can directly facially contact the first face 15, or there can be one or more first intervening layer(s) 35 between the first face 15 and the ultraviolet protection layer 25. This embodiment of an optical data medium 32 is shown in FIG. 2. A cross-section would first intersect the ultraviolet protection layer 25, then the first intervening layer(s) 35, then the substrate layer 10, and then the data layer 30. The ultraviolet protection layer 25 is permanently attached in the optical data media 7, 32 and cannot be easily removed. The ultraviolet protection layer 25 is permanently attached to the substrate 10 either directly, as shown in FIG. 1, or indirectly through one or more intervening layers 35, as shown in FIG. 2. While the substrate layer 10 can optionally contain one or more materials that absorb ultraviolet radiation, the ultraviolet protection layer 25 is not the same as the substrate layer 10.

Figure 3:
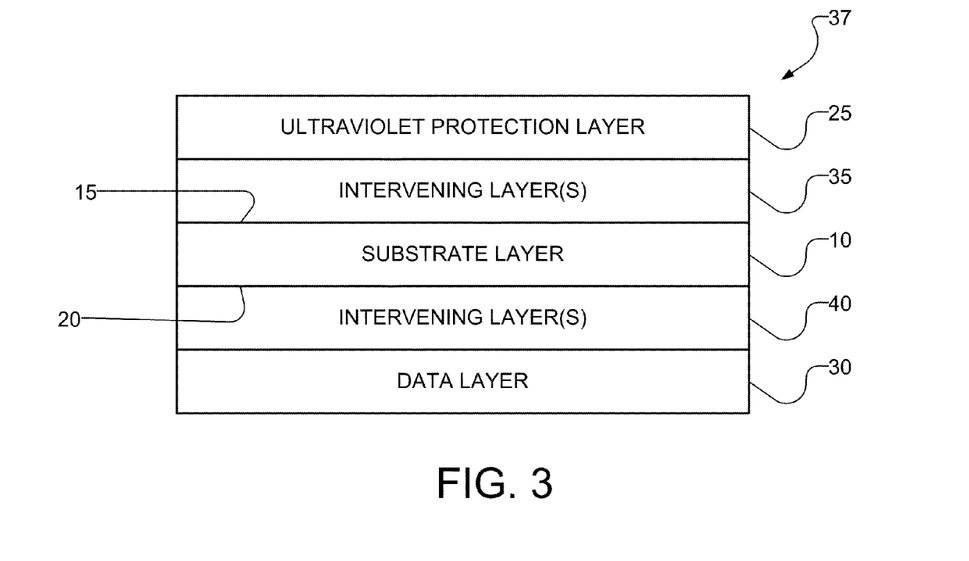
FIG. 3 shows an optical data medium containing a substrate layer, an ultraviolet protection layer, one or more first intervening layers between the substrate layer and the ultraviolet protection layer, a data layer on the opposite face of the substrate layer, and one or more second intervening layers between the substrate layer and the data layer.

The data layer 30 can directly facially contact the second face 20, as shown in FIG. 2, or there can be one or more second intervening layer(s) 40 between the second face 20 and the data layer 30. This embodiment of an optical data medium 37 is shown in FIG. 3. A cross-section would first intersect the ultraviolet protection layer 25, then the first intervening layer(s) 35, then the substrate layer 10, then the second intervening layer(s) 40, and then the data layer 10.

The substrate layer 10 can comprise polycarbonate, polystyrene, aluminum oxide, polydimethyl siloxane, polymethylmethacrylate, silicon oxide, glass, fused silica, or mixtures thereof.

The ultraviolet protection layer 25 can protect the data layer 30 from ultraviolet radiation damage, both before and after writing of data to it. Additionally, the ultraviolet protection layer 25 can protect the substrate layer 10 from ultraviolet radiation damage. The ultraviolet protection layer 25 may be placed on an outside of one or both of two outer substrates that enclose the data layer 10 when the media 7, 32, 37 is a DVD. For Blu-ray discs and CDs, the ultraviolet protection layer may be placed on an outside of the substrate and/or on an outside of the hardcoat. In any of these cases, the ultraviolet protection layer 25 may be an outermost layer that is exposed to air. Thus, this layer 25 or layers 25 can protect all the inside layers from UV radiation. In some cases, the media 7, 32, 37 is a labelless media. That is, there is no label printed or applied to an outside of the media. Thus, the media 7, 32, 37 lacks a label between the UV protective layer(s) 25 and the substrate(s). In the cases where the media has an intervening layer 35, the labelless media lacks a label between the UV protective layer(s) 25 and the intervening layer 35. The optical information medium 7, 32, 37 displays reduced damage or substantially completely eliminates damage after exposure to ultraviolet radiation as compared to a similar medium lacking the ultraviolet protection layer. Damage to be reduced or prevented can include photobleaching, photodegradation, discoloration, embrittlement, and the like.

In some embodiments, the optical data medium 7, 32, 37 has two substrate layers 10 and two ultraviolet protection layers 25, where each of the ultraviolet protection layers are outermost layers of the optical data medium 7, 32, 37.

The ultraviolet protection layer can comprise at least one absorbing material such that the ultraviolet protection layer absorbs ultraviolet radiation, but transmits the wavelength(s) for the appropriate read and write laser(s). The particular laser wavelengths vary depending on the particular optical data medium selected. For example, a CD uses 780 nm wavelength lasers; a DVD uses 650 nm wavelength lasers; and a Blu-ray disc uses 405 nm wavelength lasers. However, there is some variation in wavelengths used for different formats among these optical disc types. Disc drives typically use the same wavelength laser for both read and write functions, but can use two different lasers having different wavelengths for the read and write functions.

The ultraviolet protection layer preferably blocks UVA radiation (320-400 nm) and/or UVB radiation (280-320 nm). For convenience, the degree of blockage can be measured at 360 nm for UVA (the midpoint of 320 nm and 400 nm) and at 300 nm for UVB (the midpoint of 280 nm and 320 nm). The ultraviolet protection layer preferably blocks at least about 50%, at least about 60%, at least about 70%, at least about 80%, at least about 90%, at least about 91%, at least about 92%, at least about 93%, at least about 94%, at least about 95%, at least about 96%, at least about 97%, at least about 98%, at least about 99%, and ideally about 100% of UVA radiation as measured at 360 nm. The ultraviolet protection layer preferably blocks at least about 50%, at least about 60%, at least about 70%, at least about 80%, at least about 90%, at least about 91%, at least about 92%, at least about 93%, at least about 94%, at least about 95%, at least about 96%, at least about 97%, at least about 98%, at least about 99%, and ideally about 100% of UVB radiation as measured at 300 nm. The ultraviolet protection layer preferably transmits at least about 50%, at least about 60%, at least about 70%, at least about 80%, at least about 90%, at least about 91%, at least about 92%, at least about 93%, at least about 94%, at least about 95%, at least about 96%, at least about 97%, at least about 98%, at least about 99%, and ideally about 100% of light at the read/write wavelength(s).

A thickness 33 of the one or more UV protection layers 25 (illustrated in FIG. 1) may be in a range from about one nanometer to about one hundred ninety nanometers. In one embodiment, the thickness may be about 70 nanometers or less. In a second embodiment, the thicknesses may be from about three nanometers to about seventy nanometers. In another embodiment, the thicknesses may be from about thirty nanometers to about fifty nanometers. In a one example, the thickness of the UV protective layer(s) 25 is about fifty-four nanometers, and an intervening layer 35 of silicon dioxide having a thickness of about fifteen nanometers is placed between the UV protective layer(s) 25 and the substrate(s) 10. In another example, the thickness of the UV protective layer(s) 25 is about thirty nanometers, and an intervening layer 35 of silicon dioxide having a thickness of about ten nanometers is placed between the UV protective layer(s) 25 and the substrate(s) 10. The UV protective layer(s) 25 may be composite layers made up of two or more layers that absorb UV radiation. Thus, the intervening layer may be one of multiple layers forming the UV protective layer 25.

The ultraviolet protection layer 25 can comprise at least one absorbing material having a particular band gap value (commonly expressed as electron volts (eV), but it can be equally well expressed in nanometers (nm) by dividing 1240 eV/nm by the eV value). The band gap value is preferably less than the nanometer wavelength of the smaller numerical wavelength of the read laser and the write laser. If the optical data medium is a CD, then the absorbing material would preferably have a band gap value of less than 780 nm. If the optical data medium is a DVD, then the absorbing material would preferably have a band gap value of less than 650 nm. If the optical data medium is a Blu-ray disc, then the absorbing material would preferably have a band gap value of less than 405 nm. For example, an absorbing material having a band gap value of 551 nm (such as GaP) would be desirable for use in a CD or DVD, but not in a Blu-ray disc. In some cases, a thin layer of a material having a band gap value higher than the laser wavelength may be used.

Specific examples of materials to be included in the ultraviolet protection layer(s) 25 are zinc oxide (ZnO; 387 nm band gap), titanium dioxide ($TiO_2$; 387.5 nm band gap for anatase form and 413 nm band gap for rutile form), silicon carbide (SiC; 4H form has a 378 nm band gap, and the 6H form has a 409 nm band gap), silicon (Si; 1127 nm band gap), gallium phosphide (GaP; 551 nm band gap), cadmium sulfide (CdS; 512 nm band gap), zinc sulfide (ZnS; 344 nm band gap), silver chloride (AgCl; 387 nm band gap), silver iodide (AgI; 442 nm band gap), gallium nitride (GaN; 365 nm band gap), or mixtures thereof. Different materials may have somewhat different wavelength absorbance properties.

Figure 4:
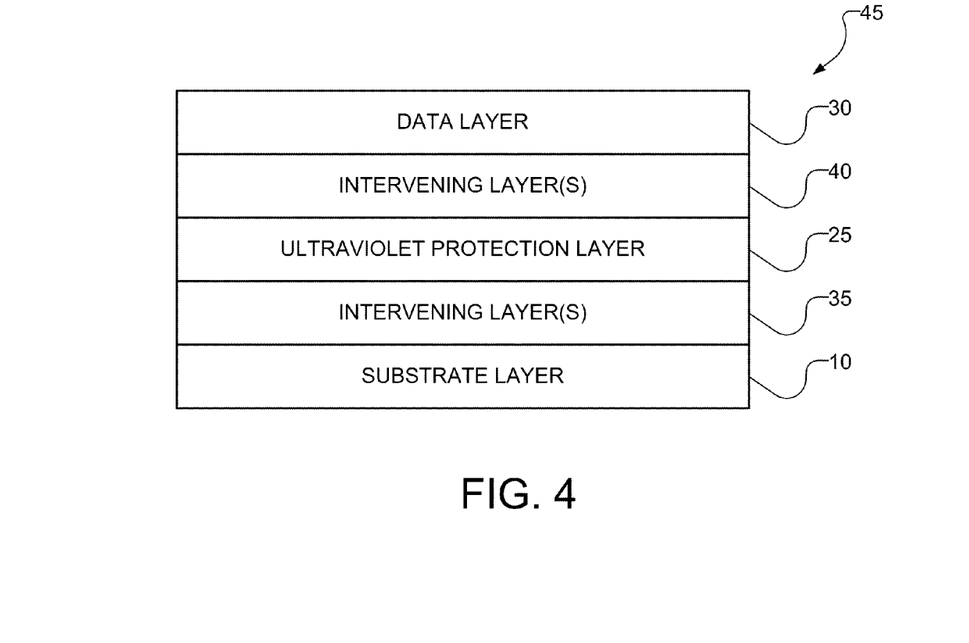
FIG. 4 shows an optical data medium containing a substrate layer, optionally one or more first intervening layer(s), an ultraviolet protection layer, optionally one or more second intervening layer(s), and a data layer.

The ultraviolet protection layer 25 can be located in the inside of an optical data medium 45, as shown in the example of FIG. 4. That is, the medium 45 has one or more layers 35, 40 on each side of the ultraviolet protection layer 25, where the ultraviolet protection layer 25 is not exposed to the outside environment. Alternatively or additionally, the ultraviolet protection layer 25 can be located on the outside of the optical data medium (i.e. the ultraviolet protection layer is exposed to the outside environment as an outermost layer), as shown and described with regard to FIGS. 1-3.

The data layer can comprise an organic dye, a cyanine dye, an azo dye, a phase change material, an ablatable material, a movable material, an alloyable material, or combinations thereof without limitation.

The optical data medium 7, 32, 37 can further comprise a label oriented away from the data layer and away from the substrate layer. In this case, the label may be disposed outside the ultraviolet protection layer 25, further away from the substrate 10 than the ultraviolet protection layer 25.

The optical data medium can further comprise one or more additional layers such as a scratch proof coating layer, a scratch resistant coating layer, a hydrophobic layer, and so on.

Referring generally back to FIGS. 1-3, in a simple form, an optical information medium 7, 32, 37 can comprise a polycarbonate support layer 10 having a first face 15 and a second face 20, an ultraviolet protection layer 25 oriented towards the first face 15, and a data layer 30 oriented towards the second face 20. In an additional specific embodiment shown in FIG. 1, the optical information medium 7 can comprise a polycarbonate support substrate 10 having a first face 15 and a second face 20, an ultraviolet protection layer 25 facially contacting the first face 15, and a data layer 30 facially contacting the second face 20.

Referring to FIG. 4, an alternative embodiment is directed towards an optical information medium 45 comprising a support layer 10, a data layer 30, and an ultraviolet protection layer 25 located between the support layer 10 and the data layer 30. The ultraviolet protection layer 25 and the data layer 30 can facially contact each other, or there can be one or more first intervening layer(s) 40. The support layer 10 and the ultraviolet protection layer 25 can facially contact each other, or there can be one or more second intervening layer(s) 35 between them. As shown in FIG. 4, a cross-section would first intersect the data layer 30, then the optional first intervening layer(s) 40, then the ultraviolet protection layer 25, then the optional second intervening layer(s) 35, and then the substrate layer 10.

Figure 5:
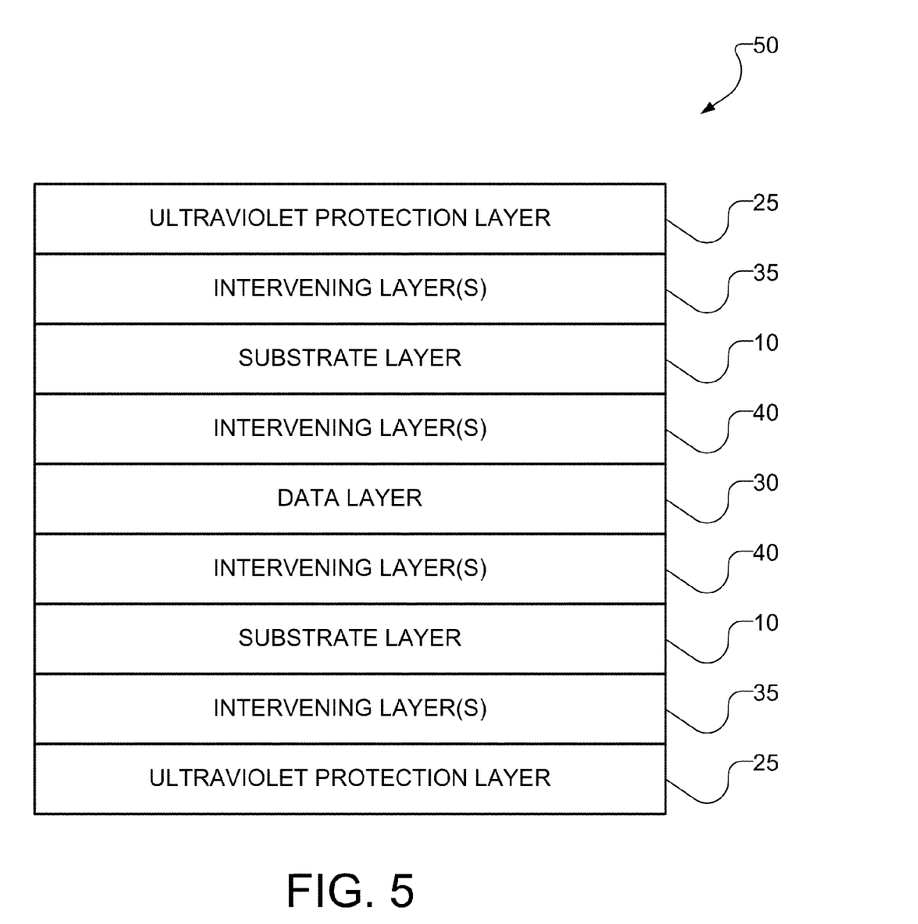
FIG. 5 shows an optical data medium containing a first substrate layer and a second substrate layer having a first ultraviolet protection layer and a second ultraviolet protection layer on respective outsides and a data layer between the first and second substrates, optionally one or more first intervening layer(s) between the between respective ultraviolet protection layers and substrates, and optionally one or more second intervening layer(s) between respective substrates and the data layer.

As shown in FIG. 5, the optical data medium 50 can further comprise a second ultraviolet protection layer oriented towards the second face, but more distant from the second face than is the data layer. In other words, a cross-section would first intersect the second ultraviolet protection layer, then the data layer, then the second face, then the first face, then the ultraviolet protection layer. As described above, any number of intervening layers at different positions may be included. This configuration broadly provides for an ultraviolet protection layer on opposite sides of the data layer, whether there is more than one substrate or not. In the embodiment shown in FIG. 5, the optical data media has first and second substrates with a data layer 30 between and the ultraviolet protection layers on outside faces of the substrates 10, opposite to the location of the data layer, which resides between the substrates 10. It is to be understood that one of the substrates may have a wobble groove, while the other is a dummy substrate. Any manner of coupling the substrates 10 and the other layers may be used, and any number of intervening layers may be included without limitation.

Methods of Preparation

An additional embodiment of the invention relates to methods of preparing an optical data medium containing an ultraviolet protection layer. The method can comprise providing an optical data medium comprising a substrate layer having a first face and a second face and a data layer oriented towards the second face, where the distance from the data layer to the second face is less than the distance from the data layer to the first face; and applying an ultraviolet protection layer oriented towards the first face, where the distance from the ultraviolet protection layer to the first face is less than the distance from the ultraviolet protection layer to the second face.

An alternative embodiment of the invention relates to methods of preparing an optical data medium containing an ultraviolet protection layer. The method can comprise providing a substrate layer having a first face and a second face, applying an ultraviolet protection layer oriented towards the first face, and applying a data layer oriented towards the first face.

The substrate layer can be any of the substrate layers discussed above.

The data layer can be any of the data layers discussed above.

The ultraviolet protection layer can be any of the ultraviolet protection layers discussed above.

The applying step can comprise physical vapor deposition (such as sputtering, reactive sputtering, e-beam evaporation, and laser ablation of a target), or chemical vapor deposition. Alternatively, the applying step can comprise spin coating.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

It is to be understood that the embodiments described herein may be combined in any manner and still remain within the scope of the embodiments of the invention.

EXAMPLES

Example 1

Materials

Zinc oxide (ZnO), titanium dioxide (TiO$_2$), silicon carbide (SiC), and silicon (Si) are common chemicals and are widely commercially available from a variety of sources such as Sigma Aldrich (St. Louis, Mo.) and Union Carbide (Danbury, Conn.). Polycarbonate blank discs are commercially available from a variety of sources such as Bayer MaterialScience AG (Leverkusen, Germany).

Example 2

Preparation of a Microscope Slide having a ZnO UV Protection Layer

Fused silica microscope slides were used as substrates (part #1018, Lot #1061010; SPI Supplies; West Chester, Pa.). Sputtering was performed using a PVD 75 instrument (Kurt J. Lesker Company; Pittsburgh, Pa.).

The fused silica microscope slides were mounted on the platen and the section of the slide 2.2 cm from the center of the platen was marked. With the platen in place in the plasma chamber, a vacuum was applied to the plasma chamber until the pressure was lower than $2.3 \times 10^{-5}$ torr. Next, argon (Ar) was introduced into the chamber such that the pressure in the chamber was about 12 mtorr (the PVD 75 instrument's Capman pressure was maintained at 13 mtorr). The plasma was lit above the ZnO target (99.99%, pure, Lot # PLA984289; Plasmaterials, Livermore, Calif.). The shutter was opened so that the microscope slide substrate was exposed to the sputtered target and the power to the gun holding the target was ramped up to 450 w RF at a rate of 0.3 w/s while the chamber pressure was reduced in steps to about 2.3 mtorr (Capman pressure was equal to 3 mtorr). Next, the power to the target was ramped down to 400 w and held there for about 10 minutes. Finally, the power was ramped down at a rate of 0.3 w/s until the plasma was extinguished.

Example 3

Evaluation of a Microscope Slide having a UV Protection Layer

The ZnO coated microscope slide, and a negative control microscope slide lacking the ZnO coating were analyzed using UV-VIS spectroscopy using an Agilent 8453 UV/VIS spectrometer (Agilent; Santa Clara, Calif.).

Figure 6:
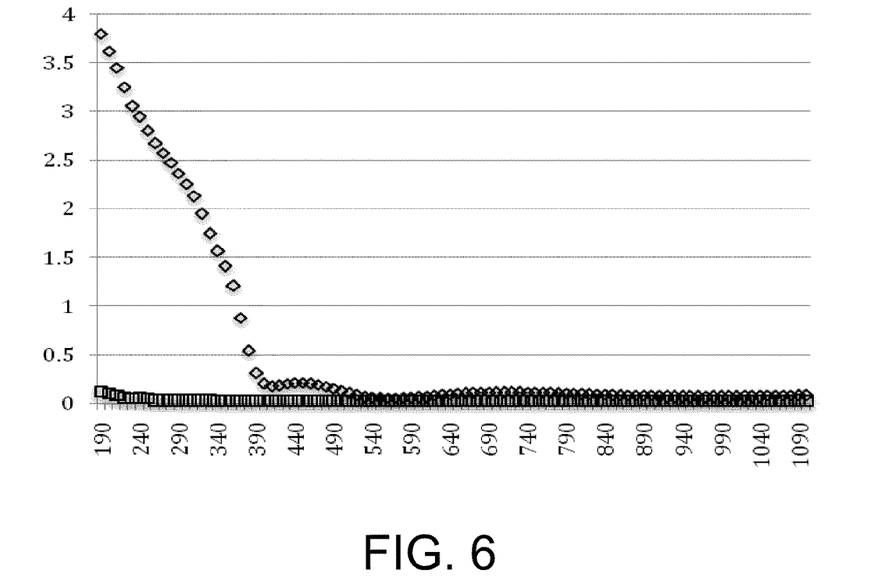
FIG. 6 shows results of UV/VIS spectroscopy on a sample containing or lacking a ZnO ultraviolet protection layer. The x-axis is wavelengths in nm. The y-axis is absorbance units. The line indicated with square symbols represents a silica sample lacking an ultraviolet protection layer. The line indicated with diamond symbols represents a silica sample containing a ZnO ultraviolet protection layer.

The results are graphically shown in FIG. 6. The line indicated with diamond symbols shows that addition of a ZnO layer effectively absorbs ultraviolet radiation in both the UVA range (320-400 nm) and the UVB range (280-320 nm). The line indicated with square symbols shows that silica lacking an ultraviolet protection layer transmits ultraviolet radiation, which could lead to degradation of a disc substrate and/or data layer.

Example 4

Preparation and Evaluation of Optical Discs having a UV Protection Layer

Six MAM-A DVD discs were selected (DVD-R 4.7 Archive 8X; MAM-A, Inc.; Colorado Springs, Colo.). The discs were fully written with data and analyzed for errors using a ShuttlePlex DVD analyzer (Optical Disc Technologies; Irvine, Calif.). Three of the six discs were coated with 10 nm of silicon dioxide (SiO$_2$) and 30 nm of titanium dioxide (TiO$_2$) for protection against ultraviolet light. The three coated discs were again analyzed, showing that the coating did not change the error profile of the discs.

All six discs were then subjected to full-spectrum light using an environmental chamber equipped with Ushio UHI-150DD/UVP Euroflood UHI series 150 Watt, 95 Volt compact metal halide lamps (5200 K color temp; 11000 lm luminous flux; Ushio America; Cypress, Calif.) for 44.5 hours. The discs were removed and analyzed again using the ShuttlePlex instrument.

The discs having an ultraviolet protection layer changed by an average of −4.1% for error types PIE8max, PIE8avg, PIEmax, PIEavg, PIFmax, PIFavg, and POF. This change is marginal, statistically insignificant, and is essentially no change. The uncoated discs changed by an average of +130.3% for the same measured error types. This change is quite large, and unacceptable for archival purposes.

This example shows that adding an ultraviolet protection layer to an optical disc confers significant protection against damage caused by ultraviolet light.

All of the compositions and/or methods and/or processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or apparatus and/or processes and in the steps or in the sequence of steps of the methods described herein without departing from the concept and scope of the invention. More specifically, it will be apparent that certain agents which are both chemically and physically related may be substituted for the agents described herein while the same or similar results would be achieved. All such similar substitutes and modifications apparent to those skilled in the art are deemed to be within the scope and concept of the invention.

What is claimed is:

1. An optical information medium, comprising:
   at least one support substrate having a first face defining a first side of the support substrate and a second face defining a second side of the support substrate;
   at least one ultraviolet protection layer on the first side of the support substrate, the ultraviolet protection layer having a thickness equal to or less than about 70 nanometers;
   an intervening layer of SiO$_2$ between the ultraviolet protection layer and the first face; and
   a data layer on the second side of the support substrate.

2. The optical information medium of claim 1, wherein the ultraviolet protection layer facially contacts the first face.

3. The optical information medium of claim 1, further comprising one or more intervening layers between the ultraviolet protection layer and the first face.

4. The optical information medium of claim 1, wherein the data layer facially contacts the second face.

5. The optical information medium of claim 1, further comprising one or more intervening layers between the data layer and the second face.

6. The optical information medium of claim 1, wherein the ultraviolet protection layer comprises titanium dioxide (TiO$_2$).

7. The optical information medium of claim 1, comprising:
a first support substrate comprising the first face and the second face;
a second support substrate comprising a first face and a second face;
a first ultraviolet protection layer oriented towards the first face of the first support substrate, where the distance from the first ultraviolet protection layer to the first face of the first support substrate is less than the distance from the first ultraviolet protection layer to the second face of the first support substrate;
a second ultraviolet protection layer oriented towards the first face of the second support substrate, where the distance from the second ultraviolet protection layer to the first face of the second support substrate is less than the distance from the second ultraviolet protection layer to the second face of the second support substrate; and
the data layer is oriented towards the second face of the first support substrate and towards the second face of the second support substrate such that the data layer is between the first support substrate and the second support substrate, where the distance from the data layer to the second face of the first support substrate is less than the distance from the data layer to the first face of the first support substrate, and the distance from the data layer to the second face of the second support substrate is less than the distance from the data layer to the first face of the second support substrate.

8. The optical information medium of claim 1, wherein the ultraviolet protection layer has a thickness of about thirty nanometers to about fifty nanometers.

9. The optical information medium of claim 1, wherein the ultraviolet protection layer forms the outermost layer of the optical information medium.

10. The optical information medium of claim 1, wherein the medium displays reduced or eliminated damage upon exposure to ultraviolet radiation as compared to a similar medium lacking the ultraviolet protection layer.

11. The optical information medium of claim 1, wherein the ultraviolet protection layer has a thickness of about one nanometer to about one hundred ninety nanometers.

12. The optical information medium of claim 1, wherein the ultraviolet protection layer has a thickness of about thirty nanometers to about fifty nanometers.

13. The optical information medium of claim 1, wherein the data layer facially contacts the second face.

14. The optical information medium of claim 1, further comprising one or more intervening layers between the data layer and the second face.

15. The optical information medium of claim 1, wherein the support substrate comprises polycarbonate, polystyrene, aluminum oxide, polydimethyl siloxane, polymethylmethacrylate, silicon oxide, glass, fused silica, or mixtures thereof.

16. The optical information medium of claim 1, wherein the support substrate comprises polycarbonate.

17. The optical information medium of claim 1, wherein the ultraviolet protection layer blocks at least about 50% of UVA radiation measured at 360 nm.

18. The optical information medium of claim 1, wherein the ultraviolet protection layer blocks at least about 50% of UVB radiation measured at 300 nm.

19. The optical information medium of claim 1, wherein the ultraviolet protection layer transmits at least about 50% of light at a laser wavelength suitable for reading or writing the optical information medium.

20. The optical information medium of claim 1, wherein the ultraviolet protection layer comprises an absorbing material having a nanometer band gap value less than the lower of the nanometer wavelength for a read laser for the medium and the nanometer wavelength for a write laser for the medium.

21. The optical information medium of claim 1, wherein the ultraviolet protection layer comprises an absorbing material having a nanometer band gap value less than 780 nm, less than 650 nm, or less than 405 nm.

22. The optical information medium of claim 1, wherein the ultraviolet protection layer comprises zinc oxide (ZnO), titanium dioxide ($TiO_2$), silicon carbide (SiC), silicon (Si), gallium phosphide (GaP), cadmium sulfide (CdS), zinc sulfide (ZnS), silver chloride (AgCl), silver iodide (AgI), gallium nitride (GaN), or mixtures thereof.

23. The optical information medium of claim 1, wherein the data layer comprises an organic dye or a cyanine dye.

24. A method for preparing an optical information medium, the method comprising:
forming the optical information medium of claim 16, wherein the formation of the medium includes:
providing a substrate layer having a first face and a second face;
supporting a data layer oriented towards the second face, where the distance from the data layer to the second face is less than the distance from the data layer to the first face; and
applying an ultraviolet protection layer having a thickness less than about seventy nanometers oriented towards the first face, where the distance from the ultraviolet protection layer to the first face is less than the distance from the ultraviolet protection layer to the second face.

25. The method of claim 24, wherein applying the ultraviolet protection layer comprises depositing the ultraviolet protection layer in direct facial contact on the first face.

26. The method of claim 24, wherein applying the ultraviolet protection layer comprises depositing an intervening layer on the first face of the substrate and depositing the ultraviolet protection layer on the intervening layer.

27. The method of claim 24, wherein the applying step comprises sputtering, reactive sputtering, e-beam evaporation, laser ablation of a target, or chemical vapor deposition.

* * * * *